United States Patent
Sengupta et al.

(10) Patent No.: US 8,935,487 B2
(45) Date of Patent: Jan. 13, 2015

(54) FAST AND LOW-RAM-FOOTPRINT INDEXING FOR DATA DEDUPLICATION

(75) Inventors: Sudipta Sengupta, Redmond, WA (US); Biplob Debnath, Minneapolis, MN (US); Jin Li, Bellevue, WA (US); Ronakkumar N. Desai, Redmond, WA (US); Paul Adrian Oltean, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 367 days.

(21) Appl. No.: 12/979,669

(22) Filed: Dec. 28, 2010

(65) Prior Publication Data

US 2011/0276781 A1 Nov. 10, 2011

Related U.S. Application Data

(63) Continuation-in-part of application No. 12/773,859, filed on May 5, 2010, now abandoned.

(51) Int. Cl.
*G06F 13/00* (2006.01)
*G06F 12/00* (2006.01)
*G06F 12/08* (2006.01)
*G06F 17/30* (2006.01)

(52) U.S. Cl.
CPC ...... *G06F 12/0862* (2013.01); *G06F 17/30097* (2013.01); *G06F 17/30159* (2013.01); *G06F 12/0866* (2013.01)
USPC .................... 711/154; 711/E12.002; 707/692

(58) Field of Classification Search
CPC ............ G06F 17/30156; G06F 3/0641; G06F 12/0866
USPC ........................... 711/154, E12.002; 707/692
See application file for complete search history.

(56) References Cited

U.S. PATENT DOCUMENTS

| 5,634,125 | A | 5/1997 | Li |
| 6,412,080 | B1 | 6/2002 | Fleming et al. |
| 6,418,515 | B1 | 7/2002 | Kurosawa |
| 6,453,404 | B1 | 9/2002 | Bereznyi et al. |
| 6,687,815 | B1 | 2/2004 | Dwyer et al. |
| 6,970,639 | B1 | 11/2005 | McGrath et al. |

(Continued)

FOREIGN PATENT DOCUMENTS

| CN | 101350869 A | 1/2009 |
| CN | 101706825 A | 5/2010 |
| CN | 101916171 A | 12/2010 |

OTHER PUBLICATIONS

Ousterhout, John, "Beating the I/O Bottleneck: A Case for Log-Structured File Systems", Jan 30, 1992.*

(Continued)

*Primary Examiner* — Edward Dudek, Jr.
(74) *Attorney, Agent, or Firm* — Henry Gabryjelski; Kate Drakos; Mickey Minhas

(57) ABSTRACT

The subject disclosure is directed towards a data deduplication technology in which a hash index service's index maintains a hash index in a secondary storage device such as a hard drive, along with a compact index table and look-ahead cache in RAM that operate to reduce the I/O to access the secondary storage device during deduplication operations. Also described is a session cache for maintaining data during a deduplication session, and encoding of a read-only compact index table for efficiency.

20 Claims, 7 Drawing Sheets

(56) References Cited

U.S. PATENT DOCUMENTS

| | | | |
|---|---|---|---|
| 6,976,229 | B1 | 12/2005 | Balabanovic |
| 7,076,602 | B2 | 7/2006 | Stark |
| 7,096,213 | B2 | 8/2006 | Chatterjee et al. |
| 7,457,934 | B2 | 11/2008 | Yagawa |
| 7,567,188 | B1 | 7/2009 | Anglin et al. |
| 7,640,262 | B1 | 12/2009 | Beaverson et al. |
| 7,725,830 | B2 | 5/2010 | Vronay |
| 7,827,182 | B1 | 11/2010 | Panigrahy |
| 2003/0093645 | A1 | 5/2003 | Wong et al. |
| 2003/0182310 | A1 | 9/2003 | Charnock et al. |
| 2004/0034869 | A1 | 2/2004 | Wallace et al. |
| 2004/0037540 | A1 | 2/2004 | Frohlich |
| 2004/0111443 | A1 | 6/2004 | Wong |
| 2005/0008343 | A1 | 1/2005 | Frohlich |
| 2005/0281541 | A1 | 12/2005 | Logan |
| 2006/0112112 | A1 | 5/2006 | Margolus et al. |
| 2006/0277180 | A1 | 12/2006 | Okamoto |
| 2007/0005874 | A1 | 1/2007 | Dodge |
| 2007/0074115 | A1 | 3/2007 | Patten et al. |
| 2007/0094277 | A1 | 4/2007 | Fachan |
| 2007/0106786 | A1 | 5/2007 | Gleichauf |
| 2008/0005141 | A1* | 1/2008 | Zheng et al. .......... 707/101 |
| 2008/0007567 | A1 | 1/2008 | Clatworthy |
| 2008/0010238 | A1 | 1/2008 | Whyte et al. |
| 2008/0133561 | A1 | 6/2008 | Dubnicki et al. |
| 2008/0243992 | A1 | 10/2008 | Jardetzky et al. |
| 2008/0294696 | A1 | 11/2008 | Frandzel |
| 2008/0306925 | A1 | 12/2008 | Campbell et al. |
| 2009/0013129 | A1 | 1/2009 | Bondurant |
| 2009/0019345 | A1 | 1/2009 | Kaufman |
| 2009/0089483 | A1 | 4/2009 | Tanaka |
| 2009/0171888 | A1 | 7/2009 | Anglin |
| 2009/0177855 | A1 | 7/2009 | Drews et al. |
| 2009/0210640 | A1 | 8/2009 | Davis |
| 2009/0238538 | A1 | 9/2009 | Fink |
| 2009/0268903 | A1 | 10/2009 | Bojinov et al. |
| 2009/0271454 | A1 | 10/2009 | Anglin |
| 2009/0300321 | A1 | 12/2009 | Balachandran |
| 2009/0319547 | A1 | 12/2009 | Hollis |
| 2010/0005380 | A1 | 1/2010 | Lanahan et al. |
| 2010/0005417 | A1 | 1/2010 | Lanahan et al. |
| 2010/0011028 | A1* | 1/2010 | Dade .......... 707/200 |
| 2010/0042790 | A1 | 2/2010 | Mondal |
| 2010/0058013 | A1 | 3/2010 | Gelson |
| 2010/0077013 | A1 | 3/2010 | Clements |
| 2010/0088296 | A1 | 4/2010 | Periyagaram |
| 2010/0094817 | A1 | 4/2010 | Ben-Shaul |
| 2010/0223128 | A1 | 9/2010 | Dukellis |
| 2010/0241629 | A1 | 9/2010 | Tatemura |
| 2010/0250858 | A1* | 9/2010 | Cremelie et al. .......... 711/136 |
| 2010/0250896 | A1 | 9/2010 | Matze |
| 2010/0299311 | A1 | 11/2010 | Anglin |
| 2011/0307447 | A1 | 12/2011 | Sabaa et al. |
| 2011/0307683 | A1 | 12/2011 | Spackman |
| 2012/0030477 | A1 | 2/2012 | Lu et al. |
| 2012/0036319 | A1 | 2/2012 | Bondurant |
| 2012/0124282 | A1 | 5/2012 | Frank et al. |
| 2012/0150823 | A1 | 6/2012 | Tofano |

OTHER PUBLICATIONS

Biplob Debnath; "FlashStore: High Throughput Persistent Key-Value Store"; Microsoft Research; Aug. 7, 2009; 1 page.

Chuanyi Liu, et al.; "ADMAD: Application-Driven Metadata Aware De-duplication Archival Storage System"; IEEE 2008; 7 pages.

Deepavali Bhagwat, et al.; "Extreme Binning: Scalable, Parallel Deduplication for Chunk-based File Backup"; Proceedings of the 17th IEEE/ACM International Symposium on Modelling, Analysis and Simulation of Computer and Telecommunication Systems, London, UK; Sep. 2009; 9 pages.

Yuanjian Xing, et al.; "PeerDedupe: Insights into the Peer-assisted Sampling Deduplication"; 2010; 10 pages.

Jack Fegreus; "Lab Review: Data deduplication for real tape"; Infostor; Jan. 22, 2010; 6 pages.

James Hamilton; "Perspectives"; Blog; May 10, 2010; 5 pages.

National Institute of Standards and Technology, FIPS 180-1.Secure Hash Standard. U.S. Department of Commerce, 1995.

M. Rosenblum and J. K. Ousterhout, "The design and implementation of a log-structured File system", ACM Transactions on Computer Systems, Jul. 24, 1991, 15 pages.

Michael A. Olson, Keith Bostic, Margo Seltzer; "Berkeley DB"; Proceedings of the FREENIX Track: 1999 USENIX Annual Technical Conference, Monterey, CA, Jun. 6-11, 1999; 10 pages.

Data deduplication in Tivoli Storage Manager V6.2 and V6.1; Published: Jun. 10, 2010; Retrieved at: https://www.ibm.com/developerworks/mydeveloperworks/wikis/home/wiki/Tivoli%20Storage%20Manager/page/Data%20deduplication%20in%20Tivoli%20Storage%20Manager%20V6.2%20and%20V6.1?lang=en, 18 pages.

Austin T. Clements, et al., "Decentralized Deduplication in SAN Cluster File Systems"; Retrieved: Oct. 20, 2010; Available at: http://static.usenix.org/event/usenix09/tech/full_papers/clements/clements_html/, 23 pages.

Ping Li, et al, "b-Bit Minwise Hashing"; WWW 2010, Apr. 26-30, 2010, Raleigh, North Carolina, 10 pages. Retrieved at: http://research.microsoft.com/pubs/120078/wfc0398-liPS.pdf.

Jianshen Wei, et al., "MAD2: A Scalable High-Throughput Exact Deduplication Approach for Network backup Services", IEEE, Published: 2010, 14 pages. Retrieved at: http://storageconference.org/2010/Papers/MSST/Wei.pdf.

Hewlett Packard, "Understanding the HP Data Deduplication Strategy"; 28 pages. Retrieved: Oct. 20, 2010; Retrieved at: http://www.usdatavault.com/library/understanding%20deduplication.pdf.

"Comparing Deduplication Approaches: Technology Considerations for Enterprise Environments"; Retrieved: Oct. 20, 2010, 4 pages. Retrieved at: http://www.busmanagement.com/article/Comparing-Deduplication-Approaches-Technology-Considerations-for-Enterprise-Environments/.

Nokolas Askitis, "Fast and Compact Hash Tables for Integer Keys", Published Date: 2009, 10 pages. Retrieved at: http://crpit.com/confpapers/CRPITV91Askitis.pdf.

Dirk Meister, et al., "dedupv1: Improving Deduplication Throughput using Solid State Drives (SSD)", IEEE, Published Date: May 2010, 6 pages. Retrieved at: http://storageconference.org/2010/Papers/MSSST/Meister.pdf.

Computer World, "MySpace Replaces All Server Hard Disks with Flash Drives"; Retrieved at: http://www.computerworld.com/s/article/91392801 on Jun. 22, 2010, 4 pages.

Cezary Dubnicki, et al., "HYDRAstor: A ScalableSecondary Storage", 7th USENIX Conference on File and Storage Technologies, Fast 2009; 14 pages. Retrieved at: http://www.usenix.org/events/fast09/tech/full_papers/dubnicki/dubnicki.pdf.

EMC Corporation. EMC Centera: Content Addresses Storage System, DataSheet, Apr. 2002, 4 pages. Retrieved at: http://www.kofax.com/distribution/pdf/EMC_Centera_en.pdf.

Kave Eshghi, et al., "A Framework for Analyzing and Improving Content-Based Chunking Algorithms", Intelligent Enterprise Technologies Laboratory, Sep. 22, 2005, 11 pages. Retrieved at:http://www.hpl.hp.com/techreports/2005/HPL-2005-30R1.pdf.

Erik Kruus, et al.; "Bimodal Content Defined Chunking for Backup Streams"; Published Feb. 23, 2010; 14 pages. Available at: http://www.usenix.org/events/fast10/tech/full_papers/kruus.pdf.

Athicha Muthitacharoen, et al.; "A Low-Bandwidth Network File System"; Proceeding SOSP '01 Proceedings of the eighteenth ACM symposium on Operating systems principles, Oct. 21, 2001, 14 pages. Retrieved at:http://pdos.csail.mit.edu/papers/lbfs.sosp01/lbfs.pdf.

Dushyanth Narayanan, et al., "Migrating Server Storage to SSDs: Analysis of Tradeoffs", EuroSys '09, Apr. 1-3, 2009, Nuremberg, Germany, 14 pages. Retrieved at:http://citeseerx.ist.psu.edu/viewdoc/downloadjsessionid=84442DAB94AF789FD80E696A7C711ED8?doi=10.1.1.150.2362&rep=rep1&type=pdf.

Sean Quinlan, et al., "Venti: A New Approach to Archival Storage". In FAST, 2002; 13 pages. Retrieved at:http://Isub.org/sys/doc/venti/venti.pdf.

(56) References Cited

OTHER PUBLICATIONS

Michael O. Rabin; "Fingerprinting by Random Polynomials"; Tech. Rep. TR-15-81. Center for Research in Computing Technology. Harvard Univ., Cambridge, Mass., 1981; 14 pages http://www.xmailserver.org/rabin.pdf.
Cristian Ungureanu, et al.; "HydraFS: A High-Throughput File System for the HYDRAstor Content-Addressable Storage System"; Proceeding FAST' 10 Proceedings of the 8th USENIX conference on File and storage technologies; Feb. 23, 2010; 14 pages.
Michael Wu, et al; "Envy: A Non-Volatile, Main Memory Storage System"; Proceeding ASPLOS VI Proceedings of the sixth international conference on Architectural support for programming languages and operating systems; Nov. 1, 1994; 12 pages.
Jacob Ziv, et al., "A Universal Algorithm for Sequential Data Compression", IEEE Transactions on Information Theory, vol. IT-23, No. 3, May 1977, 7 pages. Retreived at: http://www.cs.duke.edu/courses/spring03/cps296.5/papers/ziv_lempel_1977_universal_algorithm.pdf.
Frank Bentley, et al., "Personal vs. Commercial Content: The Similarities between Consumer Use of Photos and Music" CHI 2006, Apr. 22-27, 2006 Montreal, Quebec, Canada, Retrieved at: http://web.mit.edu/bentley/www/papers/chi06.pdf.
Electronic Papyrus Blog Archive, Audio Slideshows—Human Interest Storytelling—Published Date: Jul. 7, 2010, 4 pages. Retrieved at: http://blogs.oregonstate.edu/instructionaldesign/2010/07/20/audio-slideshows-humaninterest-storytelling/.
Ancestral Quest 12.1—Retrieved Date: Sep. 23, 2010, 6 pages. Retrieved at: http://genealogy-software-review.toptenreviews.com/ancestral-quest-software.html.
International Search Report and Written Opinion for PCT/US2011/067293 mailed Jul. 24, 2012; 9 pages.
International Search Report and Written Opinion for PCT/US2011/067292 mailed Jul. 30, 2012; 8 pages.
International Search Report and Written Opinion for PCT/US2011/067544; mailed Jul. 31, 2012; 8 pages.
"Class PersistentStore", Retrieved at: http://www.blackberry.com/developers/docs/4.5.0api/net/rim/device/api/system/PersistentStore.html, Retrieved Date: Dec. 8, 2009, pp. 3.
Norheim, Hans O., "How Flash Memory Changes the DBMS1 World an Introduction", Retrieved at: http://hansolav.net/blog/content/binary/HowFlashMemory.pdf, Apr. 22, 2008, pp. 1-12.
Spivak, et al., "Storing a Persistent Transactional Object Heap on Flash Memory", Retrieved at: http://staff.ustc.edu.cn/~jpq/paper/flash/2006-ACM%20SIGPLAN-Storing%20a%20persistent%20transactional%20object%20heap%20on%20flash%20memory.pdf; ACM SIGPLAN Notices, Proceedings of the 2006 LCTES Conference 2006, vol. 41, No. 7, Jul. 2006, pp. 22-33.
Myers, Daniel., "On the Use of NAND Flash Memory in High-Performance Relational Databases", Retrieved at: http://people.csail.mit.edu/dsm/flash-thesis.pdf, Department of Electrical Engineering and Computer Science, MIT, Msc Thesis, Feb. 2008, pp. 1-49.
Oracle; "BerkeleyDB", Retrieved at: http://www.oracle.com/technology/products/berkeley-db/index.html, Retrieved Date: Dec. 8, 2009, pp. 2.
Waclawek, Karl., "BerkeleyDB for .NET", Retrieved at: http://sourceforge.net/projects/libdb-dotnet/, Retrieved Date: Dec. 8, 2009, p. 1.
"MurmurHash Function", Retrieved at: http://en.wikipedia.org/wiki/MurmurHash, Retrieved Date: Dec. 8, 2009, pp. 2.
"Samsung SSD", Retrieved at: http://www.samsung.com/global/business/semiconductor/productInfo.do?fmly_id=161&partnum=MCCOE64G5MPP, Retrieved Date: Dec. 8, 2009, p. 1.
"TPC: Transaction Processing Benchmark", Retrieved at: http://www.tpc.org, Retrieved Date: Dec. 8, 2009, p. 1.
"Xbox LIVE 1 vs 100 game", Retrieved at: http://www.xbox.com/en-US/games/1/1v100, Retrieved Date: Dec. 8, 2009, p. 1.
Agrawal, et al., "Design Tradeoffs for SSD Performance", Retrieved at: http://research.microsoft.com/pubs/63596/USENIX-08-SSD.pdf, USENIX 2008 Annual Technical Conference on Annual Technical Conference, Jun. 22-27, 2008, pp. 14.

Andersen, et al., "FAWN: A Fast Array of Wimpy Nodes", Retrieved at: http://www.sigops.org/sosp/sosp09/papers/andersen-sosp09.pdf, ACM Symposium on Operating Systems Principles, Proceedings of the ACM SIGOPS 22nd symposium on Operating systems principles, Oct. 11-14, 2009, pp. 17.
Broder, et al., "Network Applications of Bloom Filters: A Survey", Retrieved at: http://www.eecs.harvard.edu/~michaelm/postscripts/im2005b.pdf, Internet Mathematics, vol. 1, No. 4, 2003, pp. 485-509.
Caulfield, et al., "Gordon: Using Flash Memory to Build Fast, Power-Efficient Clusters for Data-Intensive Applications", Retrieved at: http://nvsl.ucsd.edu/papers/Asplos2009Gordon.pdf, Architectural Support for Programming Languages and Operating Systems, Proceeding of the 14th international conference on Architectural support for programming languages and operating systems, Mar. 7-11, 2009, pp. 1-12.
Chen, Shimin., "Flashlogging: Exploiting Flash Devices for Synchronous Logging Performance", Retrieved at: http://www.pittsburgh.intel-research.net/-chensm/papers/FlashLogging-sigmod09.pdf, International Conference on Management of Data, Proceedings of the 35th SIGMOD international conference on Management of data, Jun. 29-Jul. 2, 2009, pp. 14.
Decandia, et al., "Dynamo: Amazon's Highly Available Key-value Store", Retrieved at: http://s3.amazonaws.com/AllThingsDistributed/sosp/amazon-dynamo-sosp2007.pdf, ACM SIGOPS Operating Systems Review, SOSP '07, vol. 41, No. 6, Dec. 2007, pp. 205-220.
Gal, et al., "Algorithms and Data Structures for Flash Memories", Retrieved at: http://www.tau.ac.il/~stoledo/Pubs/flash-survey.pdf, ACM Computing Surveys (CSUR), vol. 37, No. 2, Jun. 2005, pp. 1-30.
Binny S. Gill, et al., "STOW: A Spatially and Temporally Optimized Write Caching Algorithm", USENIX'09 Proceedings of the 2009 conference on USENIX Annual technical conference; Jun. 14, 2009; pp. 14.
Gupta, et al., "DFTL: A Flash Translation Layer Employing Demand-Based Selective Caching of Page-Level Address Mappings", Retrieved at: http://csl.cse.psu.edu/publications/dftl-asplos09.pdf, Architectural Support for Programming Languages and Operating Systems, Proceeding of the 14th international conference on Architectural support for programming languages and operating systems, Mar. 7-11, 2009, pp. 12.
Kawaguchi, et al., "A Flash-Memory Based File System", Retrieved at: http://os.korea.ac.kr/course_papers/2009_AOS/16_flash-memory_usenix95.pdf, Proceedings of the USENIX 1995 Technical Conference Proceedings on USENIX 1995 Technical Conference Proceedings, Jan. 16-20, 1995, pp. 10.
Kgil, et al., "Improving NAND Flash Based Disk Caches", Retrieved at: http://www.cs.ucsb.edu/~chong/290N/nand.pdf, International Symposium on Computer Architecture, Proceedings of the 35th Annual International Symposium on Computer Architecture, Jun. 21-25, 2008, pp. 327-338.
Kim, et al., "BPLRU: A Buffer Management Scheme for Improving Random Writes in Flash Storage", Retrieved at: http://www.usenix.org/events/fast08/tech/full_papers/kim/kim_html/index.html, Proceedings of the 6th USENIX Conference on File and Storage Technologies, Feb. 26-29, 2008, pp. 14.
Koltsidas, et al., "Flashing up the Storage Layer", Retrieved at: http://homepages.inf.ed.ac.uk/s0679010lmfdb.pdf, Proceedings of the VLDB Endowment, vol. 1, No. 1, Aug. 2008, pp. 12.
Lillibridge, et al., "Sparse Indexing: Large Scale, Inline Deduplication Using Sampling and Locality", Retrieved at: http://www.usenix.org/events/fast/tech/full_papers/lillibridge/lillibridge.pdf, Proceedings of the 7th conference on File and storage technologies, Feb. 24-27, 2009, pp. 111-123.
Nath, et al., "Online Maintenance of Very Large Random Samples on Flash Storage", Retrieved at: http://research.microsoft.com/pubs/76127/vldb2008.pdf, Proceedings of the VLDB Endowment, vol. 1, No. 1, Aug. 2008, pp. 1-14.
Nath, et al., "FlashDB: Dynamic Self-tuning Database for NAND Flash", Retrieved at: http://research.microsoft.com/pubs173678/FlashDB-IPSN07.pdf, Information Processing In Sensor Networks, Proceedings of the 6th international conference on Information processing in sensor networks, Apr. 25-27, 2007, pp. 10.

(56) References Cited

OTHER PUBLICATIONS

Pagh, et al., "Cuckoo Hashing", Retrieved at: http://www.cs.nyu.edu/courses/fall05/G22.3520-001/cuckoo-jour.pdf, Journal of Algorithms, vol. 51, No. 2, May 2004, pp. 1-27.
Avi Silberschatz, et al., "Operating System Concepts", Copyright 1994; Published 7th ed., Addison-Wesley, Boston, 1998.
Stoica, et al., "Chord: A Scalable Peer-to-Peer Lookup Service for Internet Applications", SIGCOMM '01, Aug. 27-31, 2001, San Diego, CA, pp. 1-12.
Zeinalipour-Yazti, et al., "MicroHash: An Efficient Index Structure for Flash-based Sensor Devices", Retrieved at: http://staff.ustc.edu.cn/~jpq/paper/flash/2005-FAST-MicroHash-%20An%20Effcient%20Index%20Stucuture%20for%20Flash-Based%20Sensor%20Devices.pdf, In Proceedings of the 4th USENIX Conference on File and Storage Technologies (FAST), 2005, pp. 14.
Zhu, et al., "Avoiding the Disk Bottleneck in the Data Domain Deduplication File System", Retrieved at: http://www.modcomp.com/pdf/Whitepapers/Storage/Data%20Domain/Data%20Domain%20-%20Avoiding%20the%20Disk%20Bottleneck.pdf, Proceedings of the 6th USENIX Conference on File and Storage Technologies, Feb. 26-29, 2008, pp. 14.
Zukowski, et al., "Architecture-Conscious Hashing", Retrieved at: http://www.cs.cmu.edu/~damon2006/pdf/zukowski06archconscioushashing.pdf, Data Management On New Hardware, Proceedings of the 2nd international workshop on Data management on new hardware, Jun. 25-25, 2006, pp. 8.
"System.Threading Namespace"; Retrieved on Jun. 28, 2010; 5 pages. Retrieved at: http://msdn.microsoft.com/en-us/library/system.threading.aspx.
Lawrence Livermore National Laboratory; "Fusion-IO Drive Datasheet", 4 pages, Retrieved at: http://www.fusionio.com/PDFs/Data_Sheet_ioDrive_2.pdf; No date on document nor website available anymore.
Ashok. Anand, et al.; Building Cheap and Large CAMs Using BufferHash:; University of Wisconsin Madison Technical Report TR1651, Feb. 2009, 15 pages.
S. Lee, et al.; "A Log Buffer-Based Flash Translation Layer Using Fully-Associate Sector Translation"; in ACM TECS, vol. 6, 2007, 29 pages.
Ashok Anand, et al, "Cheap and Large CAMs for High Performance Data-Intensive Networked Systems"—Published Date: 2010, 16 pages.
John Ousterhout, et al., "The Case for RAMClouds: Scalable High-Performance Storage Entirely in DRAM"—Published Date: 2010; 14 pages.
Dushyanth Narayanan, et al. "Everest: Scaling Down Peak Loads through I/O Off-Loading"; Published Date: 2008, 14 pages. Retreived at: http://citeseerx.ist.psu.edu/viewdoc/download?doi=10.1.1.144.1587&rep=rep1&type=pdf.
Sang-Won Lee, et al, "A Case for Flash Memory SSD in Enterprise Database Applications"; SIGMOD '08, Jun. 9-12, 2008, Vancouver, BC, Canada, 12 pages. Retrieved at: http://www.cs.arizona.edu/~bkmoon/papers/sigmod08ssd.pdf.
Devesh Agrawal, et al., "Flash-Optimized Index Structures for Embedded Systems"; Published Date: 2008, 14 pages. Retrieved at: ftp://ftp.cs.umass.edu/pub/techrept/techreport/2008/UM-CS-2008-008.ps.
Michael Walfish, et al., "Distributed Quota Enforcement for Spam Control"; USENIX Association, NSDI '06, 3rd Symposium on Networked Systems Design and Implementation, Published Date: 2006 Retrieved at: http://citeseerx.ist.psu.edu/viewdoc/download?doi=10.1.1.118.2151&rep=rep1&type=pdf.
"Iometer"; Retrieved on Jun. 28, 2010; 1 page. Retrieved at: http://www.iometer.org/.
My Space Case Study; "MySpace Uses Fusion Powered I/O to Drive Greener and Better Data Centers"; 2009; 6 pages. Retrieved at: http://www.fusionio.com/case-studies/myspace-case-study.pdf.
Paul Saab; "Releasing Flashcache"; MySQL@Facebook's Notes; Apr. 27, 2010; 1 page. Retrieved at: http://www.facebook.com/note.php?note_id=388112370932.
"Xbox LIVE Primetime Game"; Retrieved on Jun. 28, 2010; 4 pages. Available at: http://www.xboxprimetime.com/.
Yossi Azar; "Balanced Allocations. In SIAM Journal on Computing";1994; 21 pages.
Feng Chen, et al., "Understanding Intrinsic Characteristics and System Implications of Flash Memory Based Solid State Drives"; in ACM SIGMETRICS; 2009, 12 pages.
B. Debnath; "Speeding up Inline Storage Deduplication using Flash Memory"; in USENIX Annual Technical Conference, 2010, 16 pages.

\* cited by examiner

FAST AND LOW-RAM-FOOTPRINT INDEXING FOR DATA DEDUPLICATION

CROSS-REFERENCE TO RELATED APPLICATIONS

The application is a continuation-in-part of U.S. patent application Ser. No. 12/773,859, hereby incorporated by reference. The present application is related to copending U.S. patent applications entitled "Using Index Partitioning and Reconciliation for Data Deduplication" (U.S. patent application Ser. No. 12/979,748)," "Fast and Low-RAM-Footprint Indexing for Data Deduplication" (U.S. patent application Ser. No. 12/979,644), and "Adaptive Index for Data Deduplication" (U.S. patent application Ser. No. 12/979,681), filed concurrently herewith and hereby incorporated by reference.

BACKGROUND

Data deduplication (sometimes referred to as data optimization) is a recent trend in storage systems and generally refers to reducing the physical amount of bytes of data that need to be stored on disk or transmitted across a network, without compromising the fidelity or integrity of the original data, i.e., the reduction in bytes is lossless and the original data can be completely recovered. By reducing the resources needed to store and/or transmit data, data deduplication thus leads to savings in hardware costs (for storage and network transmission) and data-managements costs (e.g., backup). As the amount of digitally stored data grows, these cost savings become significant.

Data deduplication typically uses a combination of techniques for eliminating redundancy within and between persistently stored files. One technique operates to identify identical regions of data in one or multiple files, and physically store only one unique region (chunk), while maintaining a pointer to that chunk in association with the file. Another technique is to mix data deduplication with compression, e.g., by storing compressed chunks for each unique chunk.

In order to identify the chunks, the server that stores the chunks maintains a hash index service for the hashes of the chunks in the system. The hash uniquely identifies the chunk and serves as the key of a key, value pair. The value corresponds to the location of the chunk in a chunk store.

Because contemporary deduplication systems may need to scale to tens of terabytes to petabytes of data volume, the chunk hash index is too large to fit into a primary storage device (i.e., RAM). Thus, a secondary storage device needs to be used, such as hard disk drive or solid state drive. Index operations are thus throughput-limited by the relatively slow I/O operations executed on the secondary storage device. What is needed is a way to reduce the I/O access times as much as possible given limited primary storage resources.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a deduplication technology by which a hash index service's index is configured to maintain a log-based index in the secondary storage device, and maintain a primary storage (e.g., RAM)-based compact index table and/or a RAM-based look-ahead cache that are accessed to reduce the secondary storage device I/O access.

The RAM-based compact index table contains a compact signature and pointer that is used to map a hash value provided in a request to a location of the index in the secondary storage device in which that hash index is (possibly) maintained. If a hash is not found in the compact index table, then the hash corresponds to a new chunk that has not yet been indexed, and a not-found result is returned in response to the request. Otherwise, the pointer is followed to locate the hash value, chunk metadata for returning in response to the request; note that the requested hash value is matched via the hash value found in the index via the pointer a high probability of the time, but may not be found, in which event a not-found result is returned in response to the request.

Further, a RAM-based look-ahead cache may be used. Whenever a matched hash value is found in the secondary storage device, some number k of hash value, metadata entries are loaded into the look-ahead cache. The number obtained for loading into the cache may correspond to a file boundary, e.g., detected in the hash index as placed there at the end of each file's chunks.

In one aspect, entries of the log-structured hash index comprise hash values and metadata associated with each hash value. The hash index is updated by appending new entries to the log-structured hash index. During the append, the entries may be arranged on one or more pages of entries, such as for I/O optimization reasons. The hash index may be updated with data from a session cache, which represents entries corresponding to the files processed in the last optimization session. The session cache may also be accessed to look for chunk metadata associated with a requested hash value. At the end of each periodic deduplication session, the contents of the session cache are transactionally transferred to the main hash index. In this manner, the hash index remains "crash consistent" for the duration of the deduplication session, i.e. if there is a crash or sudden interruption of service that occurs during the deduplication session, the secondary storage remains intact and will be recovered at the start of the next deduplication session.

In another aspect, the compact index table may correspond to a subspace comprising a smaller subset of the log index table. If the subspace is full, it may become sealed (read-only) and the compact index table corresponds to a read-only mode. An encoder may access the subspace to encode the compact index into a reduced memory-size compact index table.

In one aspect, compact signatures are inserted into the compact index table by using a cuckoo hash-based algorithm to avoid hash collisions. If the cuckoo hash-based algorithm fails to find an available slot for a compact signature, which may be because there is none, or because the number of allowed attempts is limited, the compact signature may be written to a spillover table.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
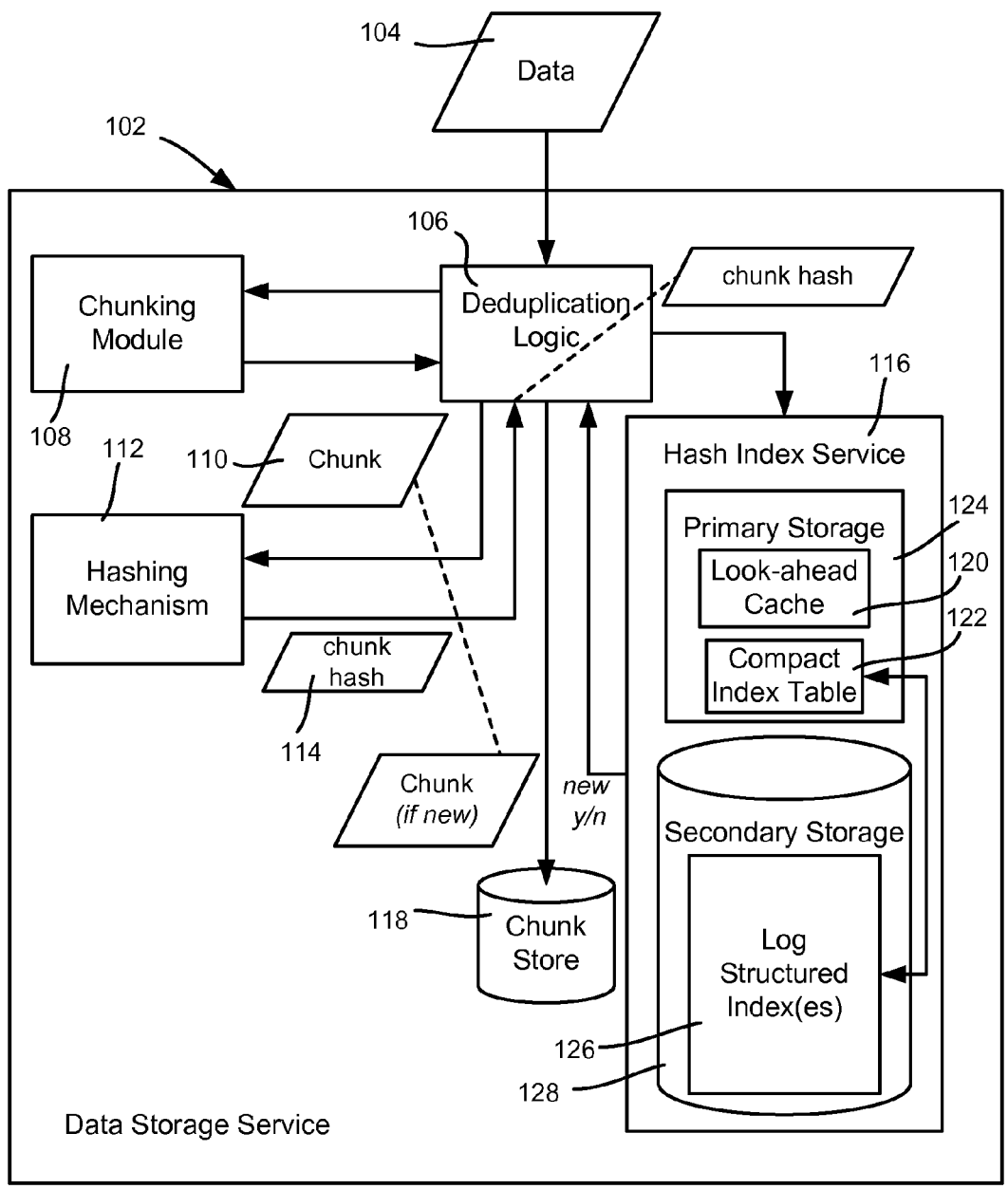
FIG. 1 is a block diagram representing example components of a data storage service configured for deduplication using a hash index service configured with a compact index table and a look-ahead cache.

Various aspects of the technology described herein are generally directed towards a hash index service that uses an entire hash index (e.g., for a storage deduplication system) in a secondary storage device (e.g., hard disk drive or solid state drive) as a log-structured index, while maintaining a relatively small auxiliary index referred to as a "compact index table" in the primary storage device (e.g., RAM). A cache, referred to as a look-ahead cache, also may be used in primary storage. In general, the compact index table and look-ahead cache operate to reduce the I/O to access the secondary storage device during deduplication operations as much as possible to achieve high deduplication throughout, while having a relatively very low primary storage footprint. At the same time, the index design accommodates the use of various types of faster secondary storage media, like flash memory.

In one aspect, a global hash index for a data deduplication service (which may correspond to the entire hash index, or a set of hash indexes for multiple subspaces as described in the aforementioned U.S. patent application entitled "Using Index Partitioning and Reconciliation for Data Deduplication)" is stored in the secondary storage device. The indexes are stored in log-based order, based on the order that the hashes are deposited and/or referred to. The look-ahead cache is associated with the hash index, and when a hash hit is identified, the nearby hash entries in the log file are loaded into look-ahead cache. As will be understood, this reduces the amount of I/O needed to perform subsequent hash lookup operations.

Further, a compact memory index table is created to assist in the lookup of the hashes in the secondary memory device. As described below, the compact index table comprises a truncated hash signature (e.g., checksum) that may be accessed to determine when a hash does not exist in the log structured index, or to determine that a hash may possibly exist in the log structured index, in which event the compact entry further identifies a location in the log structured index by which that hash may be found if it indeed exists. Typically, there is enough information in the truncated index signature such that the percentage of false positives (that is, the hash may exist but actually does not) is relatively low.

It should be understood that any of the examples herein are non-limiting. Indeed, the technology described herein applies to any type of volatile or non-volatile storage, including local and remote. Moreover, the indexing mechanisms may be used with any key, value type storage, and are not limited to data deduplication applications. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and data indexing and retrieval in general.

FIG. 1 shows example components of a content-aware data deduplication data storage system, such as implemented in a data/file storage service 102. The service 102 receives data 104 (a file, blob, or the like), and deduplication logic 106 processes the data for deduplication; note that the data and/or service may reside essentially anywhere, e.g., locally, remotely, and/or in a "dedup in the cloud" scenario. To process the data, the deduplication logic 106 provides the data 104 to a chunking module 108, which processes the content into chunks, such as according to the structure of the file (e.g., partition a media file into a media header and media body), or by using a quick calculable weak hash function (e.g., Rabin hash) that is computed at every small interval (usually for each byte). A chunk boundary is generally determined in a content-dependent fashion at positions for which the hash function satisfies a certain condition. The following description is with respect to one chunk 110, although it is understood that the data is typically partitioned into multiple chunks. Note that "content-dependent" generally refers to the concept that edits or offsets added to a file only make local changes to the generated chunks, e.g., because the Rabin fingerprint is generated from the content itself, (and not that the chunking is necessarily aware of the format of the file so as to chunk in a format-aware manner).

The deduplication logic 106 passes the chunk 110 to a hashing mechanism 112, which computes a hash of the chunk, referred to as the chunk hash 114. A strong hash function, e.g., a cryptographically secure SHA-256 hash function or the like may be used as the chunk hash 114 that uniquely identifies the chunk 110. Note that with such a secure hash, the probability of a hash collision is negligible, e.g., a hash collision is around thirty orders of magnitude less likely than a hardware error given the most reliable hardware currently available.

The chunk hash 114 is provided to a hash index service 116, which looks up the chunk hash via one or more various structures as described herein. If the chunk hash 114 is found (that is, already exists) in the hash index service 116, a duplicated copy of the chunk 110 is considered to have been already deposited in the chunk store 118, and the current chunk need not to be further stored. Instead, any reference to this chunk may simply refer to the prior, existing chunk.

If the chunk hash 114 is not found in the hash index service 116, the chunk 110 is deposited into the chunk store 118, and the chunk hash 114 is deposited into the hash index service 116. As can be readily appreciated, given enough data over time, a great deal of storage may be saved by referencing a chunk instead of maintaining many separate instances of the same chunk of data. Chunks are often also compressed, saving even more storage.

The technology described herein is directed towards an architecture and algorithms of the hash index service 116, and more particularly towards maintaining a look-ahead cache 120 and compact index table 122 in a primary storage 124, and a log-structured index 126 in a secondary storage 128. Note that the log-structured index 126 may be a single global index, or may be divided into multiple indexes, such as in a subspace-based hash index service, where a subspace is a smaller part of the overall system's global index, as described in the aforementioned U.S. patent application entitled "Using Index Partitioning and Reconciliation for Data Deduplication."

In general, the use of a log-structured index allows a number of index entries to be bundled together (e.g., in a buffer or a session cache as described below) for appending to the log index, e.g., based on reaching a certain size, periodically or as otherwise needed, so as to reduce the number of I/O operations versus inserting each entry individually into the log index. This also facilitates the use of solid-state storage devices such as flash-based memory devices, for example, where data is written in units of pages, and where writing data in log-structured manner is more efficient.

The compact index table 122 maps each hash to a location of the index in the secondary storage device 128 in which that hash value is (possibly) maintained. Moreover, look-ahead cache 120 is used, so that whenever a hit is confirmed in the secondary storage device 128, a number of k hash indexes the neighbor that was hit are loaded into the look-ahead cache 120. The number of neighbors may be determined by some fixed number, or may correspond to a file boundary. A file boundary for neighbor selection is useful in many scenarios because chunks of a file are initially indexed in order, and thus any similar file will likely have some or all of the chunks and consequently the hashes that neighbor a given chunk hash. Note that the log structured index may be configured to include an end-of-file marker to delineate hashes corresponding to chunks of each distinct file, e.g., an all zero entry; (even though a chunk hash may be all zeroes, the chunk-identifier (location id) can be defined to be non-zero so that an all zero entry is invalid and may server as an end-of-file marker in the log index).

The look-ahead cache 120 is based on the concept of locality that deduplicated chunks often neighbor each other in the source file and target destination (e.g., the chunk store and correspondingly the index). When this occurs and one hash value is hit in the secondary storage device 128, there is a reasonable probability that the next chunk hash or hashes will neighbor the previous chunk, whereby those neighbors are loaded into the cache where they may be hit in a fast cache lookup, instead of the slower secondary index lookup.

Note that the look-ahead cache 120 need not be entirely reactive in its usage, but can be proactively loaded with hash values from the log-structured index, such as based on statistics or other data such as counts maintained for a system. For example, the look-ahead cache 120 may be pre-populated with the most popular hashes (in general and/or computed relative to some time window, such as the last thirty days) as tracked by the deduplication system. Alternatively, or in addition to the most popular chunk hashes, the look-ahead cache 120 may be pre-populated with the most recently-used hashes, on the basis that the same chunks often tend to be concentrated together in time. Thus, the look-ahead cache 120 pre-fetches hashes relying on chunk locality, and also may store hashes for the most popular and/or most-frequently used chunks to further reduce the probability of disk-access and seek during lookup operations.

Well-known cache management techniques (e.g., LRU or SLRU) may be used to evict hashes as new ones are added by the above-described look-ahead/neighbor hash loading technique. Note that for efficiency, hash loading and eviction with respect to the cache 120 need not be arranged to handle a single hash at a time, and instead may load/evict in larger units, such as a page of hash entries at a time.

To summarize thus far, in one example implementation, the hash index service 116 is used to support a data deduplication system, in which the data items comprise hash, metadata pairs, and in which each the hash of a chunk of data that is used to determine whether that chunk is a duplicate of another chunk of data. The metadata is a chunk-identifier that locates the chunk in the chunk store. The hash, metadata pair is mainly stored in a log-structured index 126 in the secondary storage device 128.

With respect to the compact index table 122, a truncated version of the hash is maintained in the primary storage device as a compact index table. As generally described above, the compact index table 122 stores compact key signatures (truncated hash) instead of full chunk hashes, so as to strike tradeoffs between RAM usage and false reads.

To approach maximizing hash table index capacity (the number of entries) while minimizing false flash reads, one implementation stores a compact M-bit/byte length key signature (on the order of a few bytes, e.g., two bytes) in each entry of the compact index table 122. This signature may be derived from both the key and the candidate position number at which the key is stored. When a key x is stored in its candidate position number i, the signature in the respective hash table index slot is derived from the higher order bits of the hash value $j_{hi}(x)$. During a search operation, when a key y is looked up in its candidate slot number j, the respective signature is computed from $j_{hj}(y)$) and compared with the signature stored in that slot. Only if a match happens is the pointer to the log structured index 126 followed to check if the full key (full hash) matches. The percentage of false reads is relatively low, e.g., the number of candidate slots divided by the signature space (which for a two byte signature space is 65536).

The primary storage (e.g., RAM) size for the compact index table 122 can be determined with application requirements in mind. With a two-byte compact key signature and N-bit/byte length (e.g., equal to four-byte) log index pointer per entry, which is a total of six bytes per entry, a typical RAM usage of 4 GB per machine for the hash table index accommodates a maximum of about 715 million chunk-hash entries. At an average of 8 KB size per data chunk, this accommodates about 6 TB of deduplicated data. Alternatively, with 64 bytes allocated for a chunk-hash and its metadata, this corresponds to about 45 GB of chunk metadata. For deduplication, the deduplication system is designed to use a relatively small number of bytes in RAM per entry (e.g., the six-bytes per compact entry) so as to maximize the RAM hash table index capacity for a given RAM usage size.

The compact index table 122 may correspond to a read-only mode, and there may be read-only compact index tables if subspaces are in use, e.g., a subspace becomes a read-only subspace when that subspace is full and may become "sealed." As described below, for a read-only compact index table, an encoding mechanism (algorithm) may be used to calculate an encoded compact index table (e.g., a truncated cuckoo hash-based table as described below) from the existing entries in the subspace that uses even less memory space with a higher hash table fill rate. The compact index table 122 may then be consulted to locate a hash in the subspace, using only six bytes per hash entry for the compact index table in one implementation.

The compact index table 122 may correspond to a write mode to which new hash entries may be added. A truncated cuckoo hash table also may be used in the write mode. To reduce the complexity of collisions when new hash entries are added to the compact index table, a relatively small spillover hash table may be used, as described below.

Figure 2:
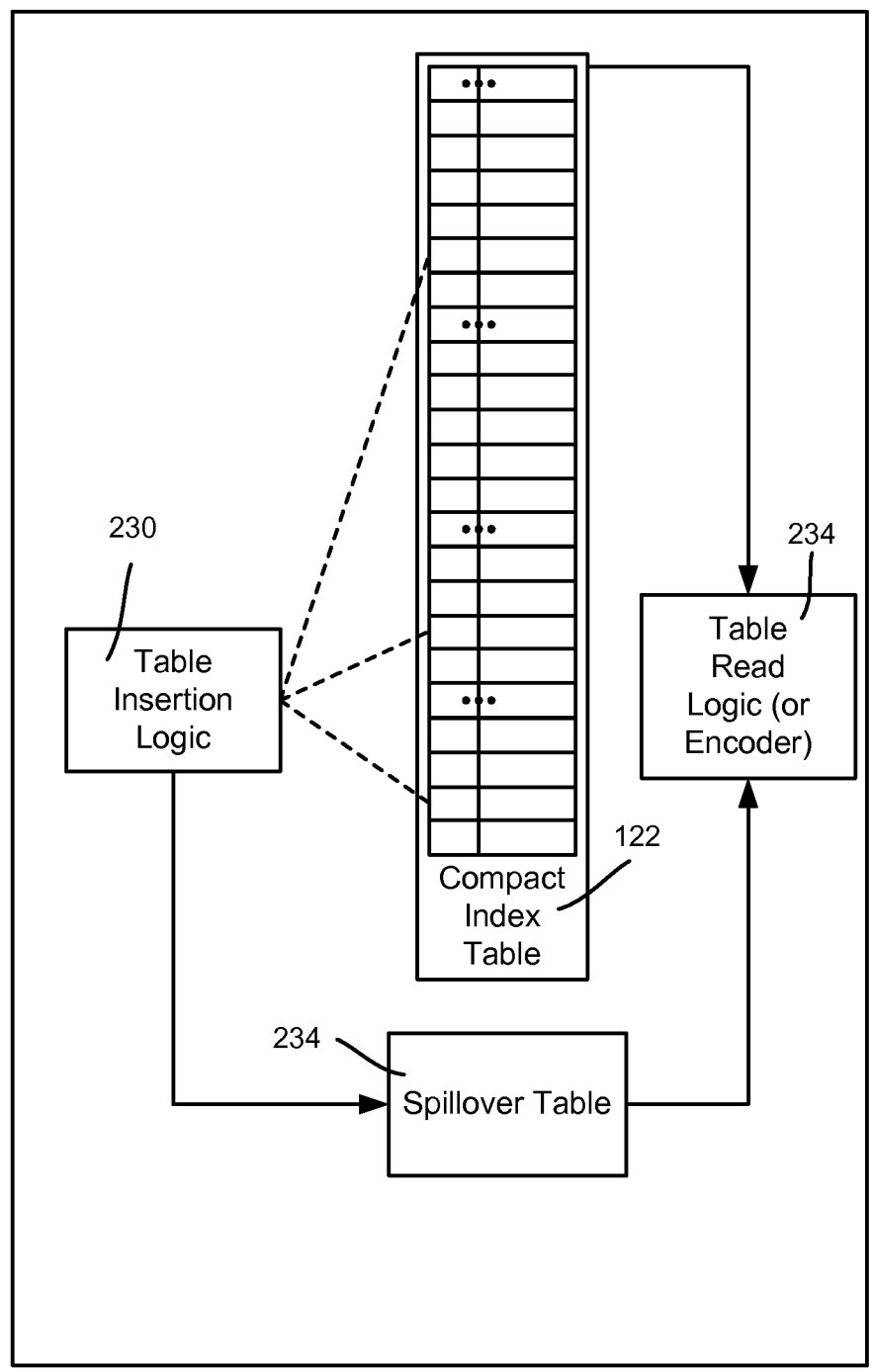
FIG. 2 is a block diagram representing how a spillover table may be used for efficiency or when the compact index table is full.

More particularly, the compact index table may resolve hash collisions by cuckoo hashing. As represented in FIG. 2, the compact hash table index 122 is structured as an array of slots. In one implementation, hash collisions, in which multiple compact signatures map to the same hash table index slot, are resolved by table insertion logic 230 using cuckoo hashing or a variant of cuckoo hashing. To this end, cuckoo hashing provides flexibility for each compact signature to be in one of n≥2 positions; a cuckoo hashing variant keeps the linear probing chain sequence upper bounded at n and may result in a write to a spillover table as described below. Note that cuckoo hashing increases hash table load factors while keeping lookup time bounded to a constant.

In a variant of cuckoo hashing used in one implementation, n random hash functions $h_1, h_2; \ldots h_n$ are used to obtain n candidate positions for a given compact signature x. These candidate position indices for compact signature x are obtained from the lower-order bit values of $h_1(x), h_2(x); \ldots h_n(x)$ corresponding to a modulo operation.

During insertion, the compact signature and its metadata entry is inserted in the first available candidate slot. When all slots for a given compact signature x are occupied during insertion, (e.g., by compact signatures $y_1, y_2; \ldots y_n$), room can be made for compact signature x's entry by relocating compact signatures $y_i$ in these occupied slots, because each compact signature $y_i$ may be placed in a choice of (n−1) other locations. Note that in the original cuckoo hashing scheme, a recursive strategy is used to relocate one of the compact signatures $y_i$; however in a worst case, this strategy may take many relocations, though the probability for which can be shown to be very small and decreasing exponentially in n.

Thus, the process of the table insertion logic 230 may attempt some number of entry relocations, after which if unsuccessful, may operate according to a number of options. One of the options is to have the deduplication service pause deduplication and rebuild the compact index table as a newer, larger compact index table before resuming deduplication. Another option is linear chaining, which inserts/looks for linearly subsequent slots after some number of attempts. Yet another option, which may avoid the overhead of a rebuilding a write-mode compact index table, and the increased I/O cost of access in linear chaining, is to write the compact signature and metadata entry to a spillover table 232. In the variant of cuckoo hashing, the write may be to the spillover table 232 as soon as some small number of attempts have been unsuccessful, to avoid the computations needed to continue with further cuckoo hash attempts. If the spillover table 232 is used, the table read logic (or an encoder) 234 knows to access the spillover table 232 if unsuccessful in looking up a compact signature in the compact index table 122, or if the index table becomes sealed and/or encoded as described below.

Turning to another aspect, a read-only compact index table may be encoded to save additional memory space, as well as reduce false positives, such as in an offline encoding process. More particularly, when in a write mode, a compact-index table has to reserve some extra memory space to help cuckoo hashing efficiently resolve collisions (to avoid too much computation/searching for an open slot and/or or overuse of a spillover table or the like, which add inefficiency). The occupancy rate is generally on the order of eighty-to-ninety percent. However, once read-only, all of the keys are known, and such extra space is not needed since there are no new keys to insert, and most of the extra space can be reclaimed (some still may remain after encoding); the occupancy rate after encoding is generally on the order of ninety-five to ninety eight percent.

To this end, a sealed subspace may be processed, and for all entries to put in the compact index table that indexes that subspace, a bipartite graph may be generated to link each key to its candidate positions. After removing conflicts, encoding can be computed through the search of a match, as described in U.S. patent application Ser. No. 12/725,840 "Cuckoo hashing to store beacon reference data," hereby incorporated by reference. Note that matching without first removing the conflicts will increase false positives, and thus it is generally more optimal to remove the conflicts, which adds a little extra memory space but results in an encoded compact index table that eliminates false positives.

Figure 3:
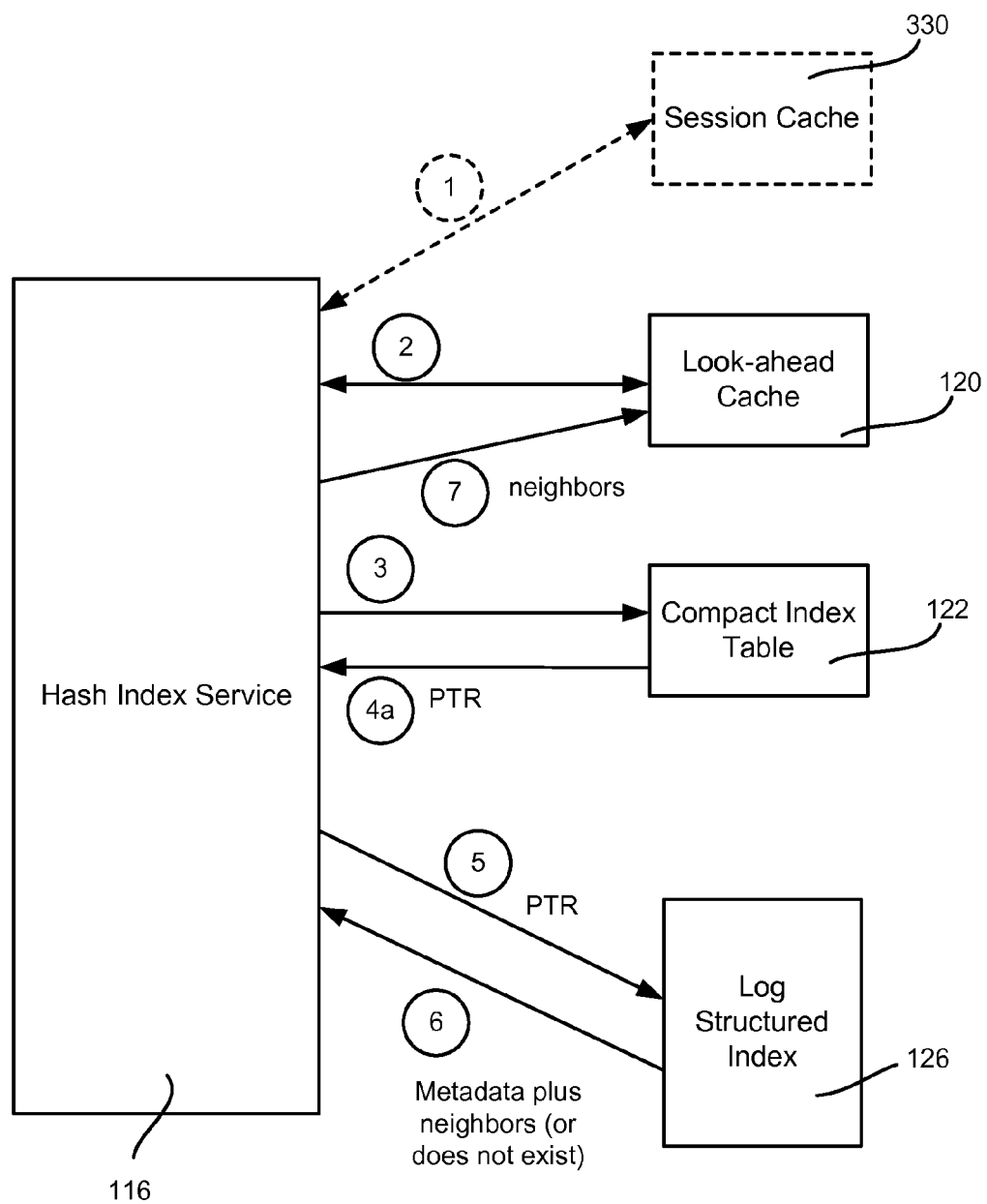
FIG. 3 is a diagram representing example operations performed by a hash index service to handle a lookup operation for a requested hash value, including when a compact signature for the hash value is found in the compact index table.
Figure 4:
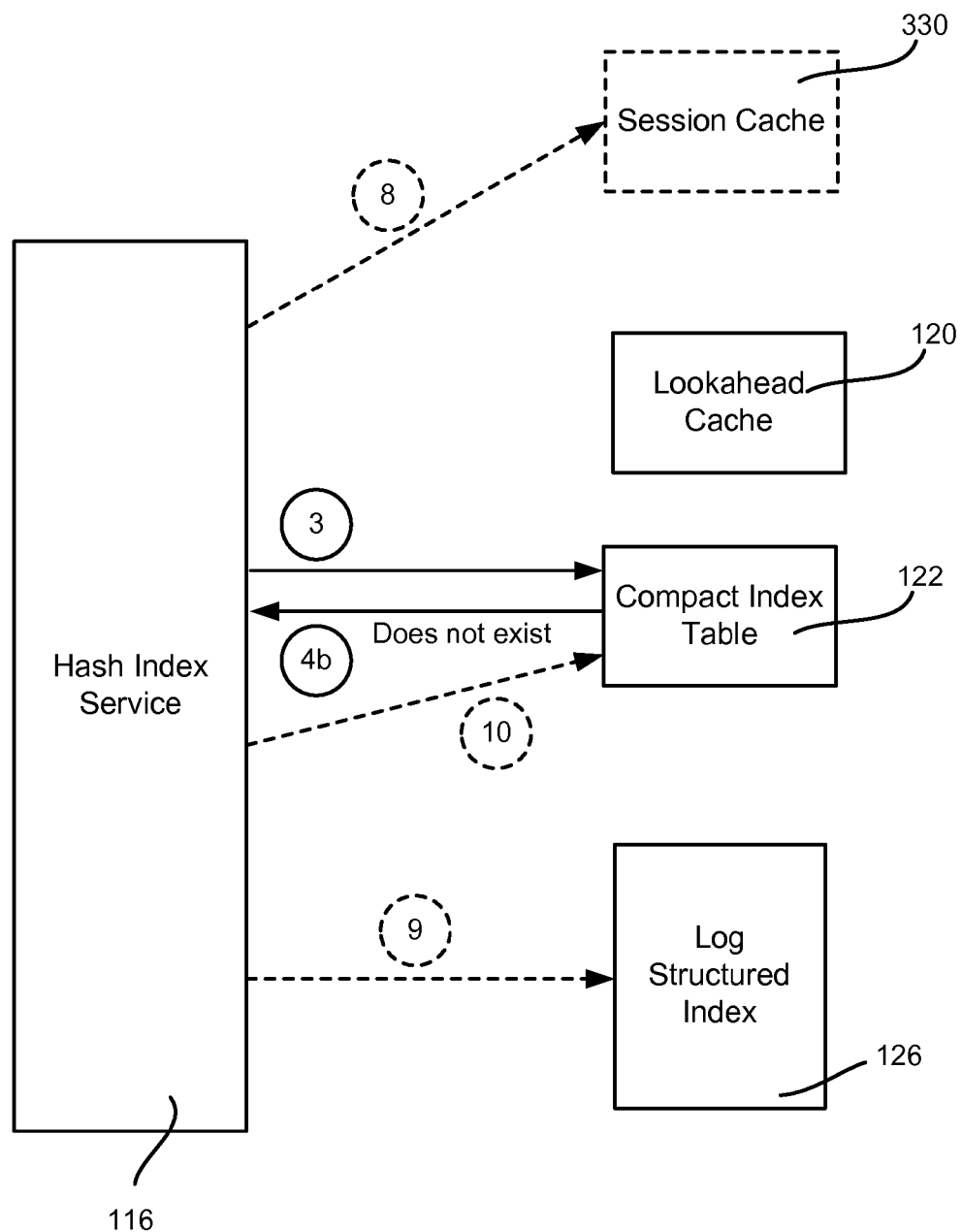
FIG. 4 is a diagram representing example operations performed by a hash index service to handle a lookup operation for a requested hash value, including when a compact signature for the hash value is not found in the compact index table.

FIGS. 3 and 4 show some of the data flow operations between the various components described above, with the operations represented by arrows labeled with circular numerals. In FIG. 3, as represented by arrow one (1), the hash index service 116 first checks a session cache 330 (if any is in use) to determine if the chunk was already determined to be a new chunk in this session. More particularly, for efficiency, the deduplication service may process a number of files as a batch (e.g., in a deduplication session), and then commit the chunks to the chunk store, and the (hash, chunk metadata) index updates together. The deduplication service uses a session cache 330 for this purpose (if such batching is taking place in a given implementation). Thus, there is a chance that a hash has already been detected as new and thus resides in the session cache 330, which may be looked up efficiently as it resides in primary storage for subsequently committing to the log index 126 in secondary storage. If found, the hash index service 116 returns the metadata for that hash, and the lookup operations end.

At the end of the deduplication session, the session cache is periodically "flushed" into the main index. This is done by iterating through the hashes stored into the session cache, and moving them to the main index, in a transactional, all-or-nothing approach. The reason for keeping the hash index and session cache separate is to ensure a transactional update of the hash index data structures at the end of each deduplication session.

If not found in the session cache 330 or there is no session cache in use, the hash index service accesses the look-ahead cache 120 for the hash, as represented by arrow two (2) and as generally described above. If found, the hash index service 116 returns the metadata for that hash, and the lookup operations end.

If not found in the look-ahead cache 120, the hash index service looks in the compact index table for a compact signature of the hash value as represented by arrow three (3). If not found, then this is a new hash, and the hash index service returns a "not found" status to the deduplication service, after which the chunk and index entry may be handled accordingly via an insert operation, e.g., inserted from the session cache or directly into the log structured index (or a buffer for that log structured index, such as a page-based buffer, which may be considered part of the index even if maintained in primary storage). The compact index table is updated as the hash index is appended.

In the example of FIG. 3, consider that one or more compact signatures are found in the compact index table 122, and that the corresponding pointers to the log-structured index are returned (arrow (4a)). The hash index service uses each pointer (arrow five (5)) to search the log structured index 126 for the full hash value. If not found, (all compact signatures were actually false positive), "not found" information is returned to the deduplication service. If found, this is a hit, and the hash's chunk metadata, along with the found hash's neighboring hashes are returned (arrow six (6)). The neighboring hashes may be added to the look-ahead cache 120 (arrow seven (7)), evicting other entries as appropriate.

In the example of FIG. 4, consider that after accessing the compact index table, the hash is found to not exist (arrow (4b)). In this case, the hash is new, a "not found" result returned to the deduplication service and a subsequent insert will be performed. This may include a write to the session cache (arrow eight (8)), or a write to the log-structured index (or a to-be-written buffer, which may be considered part of the index) at arrow nine (9). If a session cache is not in use, the compact index table may be updated (arrow tend (10)).

Figure 5:
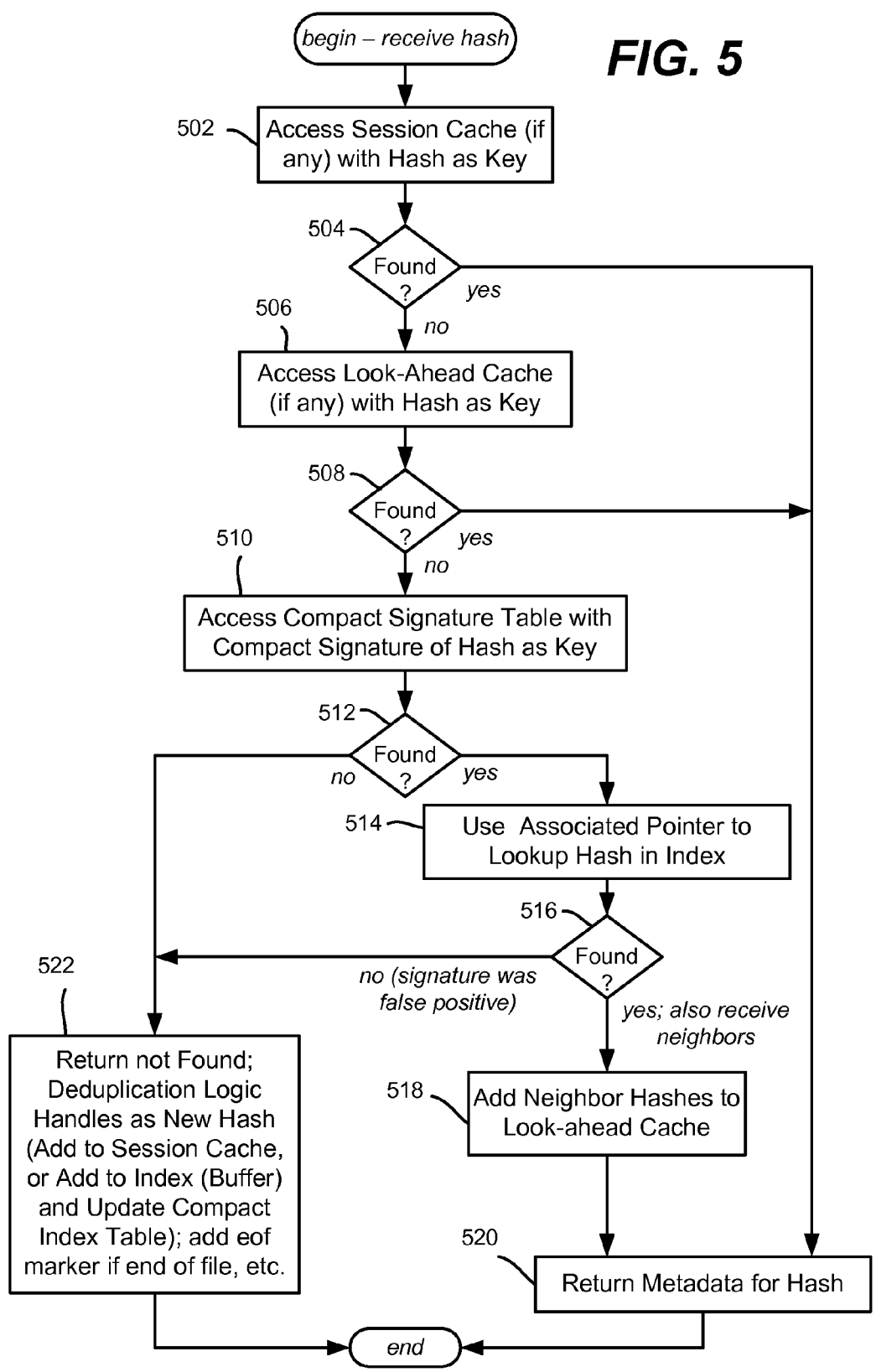
FIG. 5 is a flow diagram representing example steps for handling a request to return metadata or a not-found response given a hash value.

FIG. 5 is a flow diagram showing some of the logic of the hash indexing service in the form of example steps to determine whether a hash value corresponds to a new or existing chunk. Step 502 checks the session cache for the hash, if one exists. If found (step 504), the process returns the accompanying chunk metadata at step 520 and ends.

If not found at step 502 or no session cache exists, step 506 represents accessing the look-ahead cache. If found (step 506), the process returns the accompanying chunk metadata at step 520 and ends.

Step 510 represents looking for the hash's compact signature in the compact signature table. If not found (step 512), then this hash is known to correspond to a new chunk, and a not found response is returned at step 522. Step 522 also represents other aspects of handling a new chunk, such as in response to an insert call to the hash index service.

As described above, if one or more compact signatures are found at step 512, then the pointer associated with each of the compact signature is used to look up the full hash value in the log-structured index at step 514 (which may include spillover table access or linear chain processing). If not found (step 516), this compact signature entry was a false positive. If all compact signature entries (or entry if only one) are false positive, the process returns a not found via step 522 for handling as a new chunk.

If the hash is matched in the index at step 516, then the chunk metadata is returned via step 520. Also, the neighbor hashes are obtained (step 518) and added to the look-ahead cache.

As can be seen, the use of a log-structured index, a look-ahead cache, and a compact index table provide for efficient memory usage while reducing I/O access to the secondary storage device in a deduplication system. Other aspects, such as a session cache, read-only compact index tables for subspaces, encoding read-only compact index tables, provide further benefits in a deduplication system.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
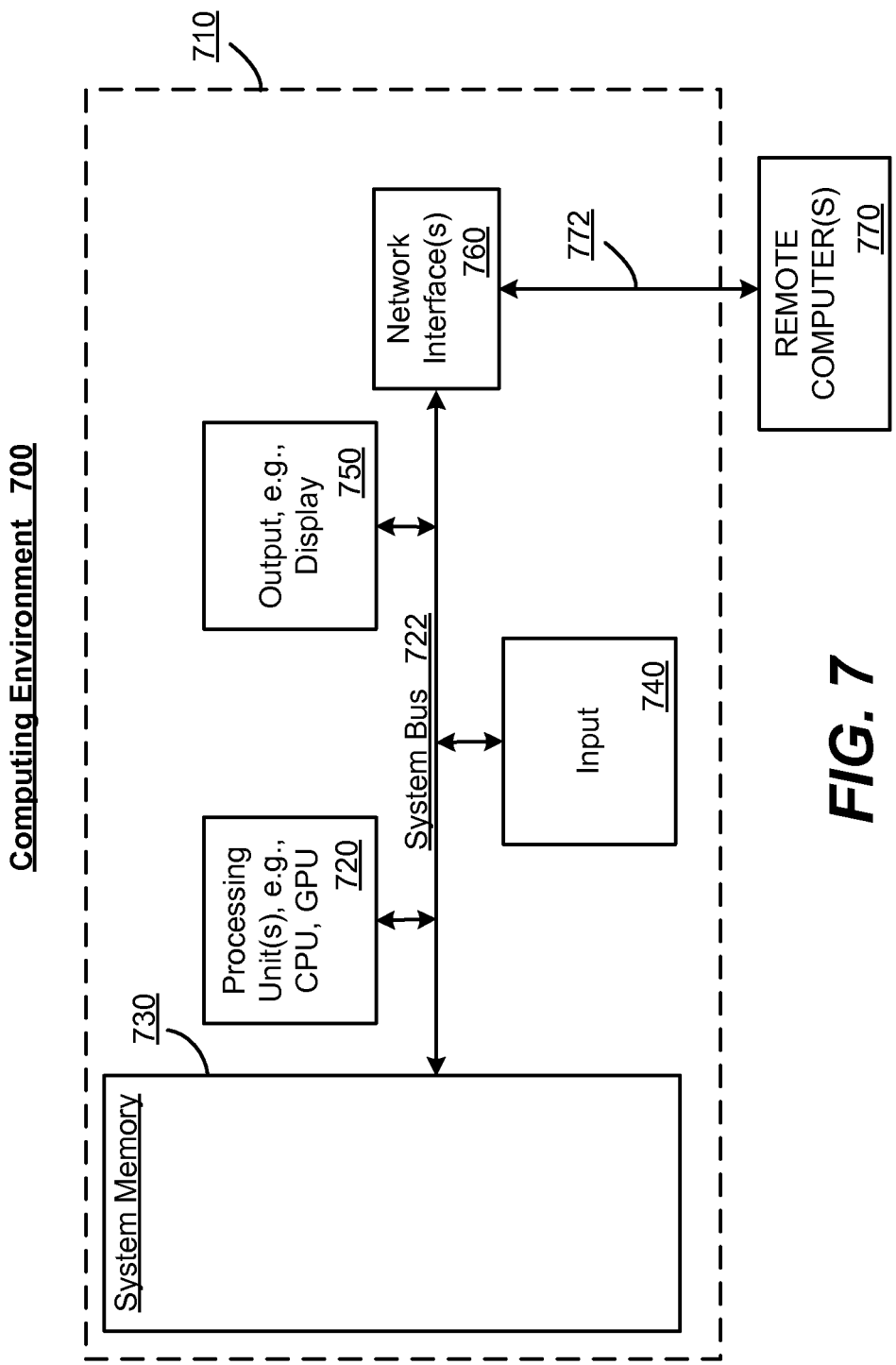
FIG. 7 is a block diagram representing an exemplary non-limiting computing system or operating environment in which one or more aspects of various embodiments described herein can be implemented.

FIG. 7 provides a schematic diagram of an exemplary networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720,

722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the exemplary computing system environment 800.

With reference to FIG. 8, an exemplary remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a system comprising:
a log-structured hash index maintained in a secondary storage device, in which entries of the log-structured hash index comprise hash values of data chunks and associated metadata with each hash value, the hash index updated by appending new entries to the log-structured hash index;
a compact index table maintained in a primary storage device that includes compact signatures representative of the hash values;
a look-ahead cache in the primary storage device that includes hash values and metadata entries cached from a log index table; and
a hash index service configured to access the look-ahead cache to perform a lookup based on a hash value computed for a chunk and return the metadata associated with that hash value if found in the look-ahead cache, or if not found to access the log-structured hash index to perform the lookup and return the metadata associated with that hash value if found in the log-structured hash index or return a not-found result if not found in the log-structured hash index, and wherein the hash index service is further configured to obtain one or more neighbor hash index, metadata entries, when accessing the log-structured index, and to add the one or more neighbor hash index, metadata entries to the look-ahead cache.

2. The system of claim 1 wherein the hash index is updated by using pages of entries when appending to the log-structured hash index.

3. The system of claim 1 wherein the hash index service is further configured to access a session cache in a primary storage device to lookup a hash value and return the metadata associated with that hash value if found in the session cache, so as to not need to access the log-structured hash index for the metadata if found in the session cache.

4. The system of claim 1 wherein the compact index table further includes for each compact signature, a pointer to a corresponding position of a hash value, metadata entry in the log on secondary storage, wherein the hash index service is further configured to access the compact index table to lookup a compact signature corresponding to a requested hash value to lookup, and to return a not-found result if the compact signature is not found in the compact index table, and to follow the pointer to look for an entry in the log-structured hash index that possibly contains requested hash value if the compact signature is found in the compact index table.

5. The system of claim 4 wherein each compact signature comprises an M-bit length value derived from the hash value and a candidate position at which the hash value, metadata entry is possibly stored, wherein the candidate position corresponds to an N-bit length pointer.

6. The system of claim 4 wherein a plurality of entries in the compact index table are associated with the requested hash value, wherein the hash index service's access of the compact index table includes evaluating the plurality of entries in the compact index table via their associated compact signatures, wherein each compact signature is matched to a hash value, and wherein the hash index service is configured to return a not-found result if all corresponding compact signatures are not found in the compact table, or for each compact signature that is found, to match to the requested hash value and to follow the pointer associated with that hash value to look for an entry in the log-structured hash index that possibly contains requested hash value, and to return a not-found result only if no pointer points to an entry that contains the requested hash value.

7. The system of claim 1 wherein the look-ahead cache pre-fetches hashes relying on chunk locality.

8. The system of claim 1 wherein the look-ahead cache includes one or more hash value, metadata entries placed in the look-ahead cache based upon popularity of one or more corresponding deduplication chunks.

9. The system of claim 1 wherein the look-ahead cache includes one or more hash value, metadata entries placed in the look-ahead cache based upon recent usage of one or more corresponding deduplication chunks.

10. The system of claim 1 wherein the hash index service is further configured to obtain one or more I/O operations when accessing the log-structured index, and to add the one or more I/O operations to the look-ahead cache.

11. The system of claim 1 wherein the hash index service is further configured to obtain the one or more neighbor hash index, metadata entries up to a file boundary that corresponds to a deduplicated file, in which the one or more neighbor hash index, metadata entries each correspond to a deduplicated chunk of that file.

12. In a computing environment, a method performed at least in part on at least one processor, comprising:
    maintaining a hash index in a secondary storage device, in which entries of the hash index include hash values, each hash value being computed from a deduplicated data chunk, and being associated with metadata by which the deduplicated data chunk is locatable;
    maintaining a compact index table in a primary storage device that includes compact signatures representative of the hash values in the hash index, and for each compact signature, a pointer to a location of the corresponding hash value in the hash index;
    maintaining a look-ahead cache in the primary storage device that includes hash values and metadata entries cached from a log index table;
    mapping each hash value to up to two or more entries in the compact index table, in which each entry contains a unique signature;
    accessing the compact index table to lookup a compact signature corresponding to a requested hash value provided in a request, and returning a not-found result in response to the request if none of the compact signatures are found in the compact index table, or following one or more pointers to determine whether an entry in the hash index contains the requested hash value if the compact signature is found in the compact index table;
    obtaining one or more neighbor hash index, metadata entries, when accessing the hash index; and
    adding the one or more neighbor hash index, metadata entries to the look-ahead cache.

13. The method of claim 12 wherein the compact signature is found in the compact index table, and further comprising, returning metadata associated with the requested hash value from the hash index in response to the request if the entry in the hash index found via the pointer is determined to contain the requested hash value, or returning a not-found result in response to the request.

14. The method of claim 12 further comprising, inserting a compact signature into the compact index table by using a cuckoo hash-based algorithm to avoid hash collisions.

15. The method of claim 14 further comprising, writing at least one compact signature to a spillover table instead of inserting the compact signature into the compact index table when all entries of the compact index table are occupied, or when a sufficient number of cuckoo relocations have been attempted, or both.

16. One or more computer storage devices having computer-executable instructions, which in response to execution by a computer, cause the computer to perform steps comprising,
    maintaining a hash index in a secondary storage device, in which entries of the hash index include hash values, each hash value being computed from a deduplicated data chunk, and being associated with metadata by which the deduplicated data chunk is locatable;
    maintaining a look-ahead cache in a primary storage device that includes hash values and metadata entries cached from the hash index;
    accessing the look-ahead cache to lookup a requested hash value provided in a request, and returning metadata in response to the request if the requested hash value is found in the look-ahead cache;
    obtaining one or more neighbor hash index, metadata entries, when accessing the hash index; and
    adding the one or more neighbor hash index, metadata entries to the look-ahead cache.

17. The one or more computer storage devices of claim 16 having further computer-executable instructions, comprising if the requested hash value is not found in the look-ahead cache, accessing the hash index to look for the requested hash value.

18. The one or more computer storage devices of claim 17 wherein the hash index contains the requested hash value, and having further computer-executable instructions, comprising, loading the look-ahead cache with neighbor entries of the requested hash value.

19. The one or more computer storage devices of claim 18 wherein loading the look-ahead cache with neighbor entries of the requested hash value comprises, obtaining the neighbor entries up to a file boundary indicator detected in the hash index.

20. The one or more computer storage devices of claim 16 having further computer-executable instructions, comprising, populating the look-ahead cache with commonly accessed file chunks.

\* \* \* \* \*

UNITED STATES PATENT AND TRADEMARK OFFICE
CERTIFICATE OF CORRECTION

| | | |
|---|---|---|
| PATENT NO. | : 8,935,487 B2 | |
| APPLICATION NO. | : 12/979669 | |
| DATED | : January 13, 2015 | |
| INVENTOR(S) | : Sudipta Sengupta et al. | |

Figure 6:
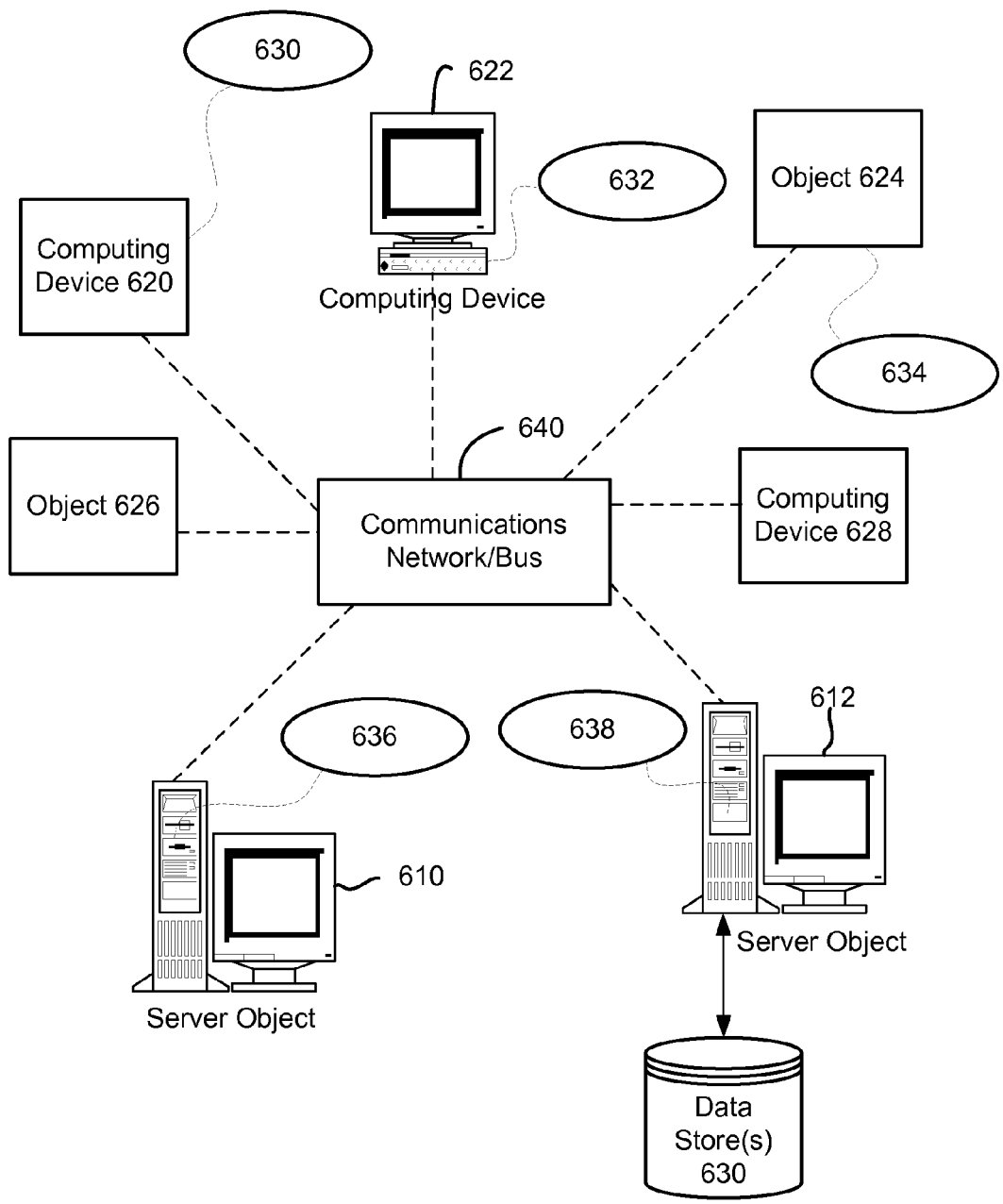
FIG. 6 is a block diagram representing exemplary non-limiting networked environments in which various embodiments described herein can be implemented.

It is certified that error appears in the above-identified patent and that said Letters Patent is hereby corrected as shown below:

In the Specification:

Column 10, lines 8-34, delete "7" and replace with "6" to read:

FIG. 6 provides a schematic diagram of an exemplary networked or distributed computing environment. The distributed computing environment comprises computing objects 610, 612, etc., and computing objects or devices 620, 622, 624, 626, 628, etc., which may include programs, methods, data stores, programmable logic, etc. as represented by example applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, etc.
Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6 communications network 640 may comprise other computing objects and computing devices that provide services to the system of FIG. 6, and/or may represent multiple interconnected networks, which are not shown. Each computing object 610, 612, etc. or computing object or device 620, 622, 624, 626, 628, etc. can also contain an application, such as applications 630, 632, 634, 636, 638, that might make use of an API, or other object, software, firmware and/or hardware, suitable for communication with or implementation of the application provided in accordance with various embodiments of the subject disclosure.

Column 10, lines 60-67 through Column 11, line 1, delete "7" and replace with "6" to read:

In a client / server architecture, particularly a networked system, a client is usually a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc., acting as servers provide data services, such as receiving data from Signed and Sealed this
Ninth Day of August, 2016

Michelle K. Lee
*Director of the United States Patent and Trademark Office*

CERTIFICATE OF CORRECTION (continued)
U.S. Pat. No. 8,935,487 B2 client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances.

Column 11, lines 13-23, delete "7" and replace with "6" to read:

In a network environment in which the communications network 640 or bus is the Internet, for example, the computing objects 610, 612, etc. can be Web servers with which other computing objects or devices 620, 622, 624, 626, 628, etc. communicate via any of a number of known protocols, such as the hypertext transfer protocol (HTTP). Computing objects 610, 612, etc. acting as servers may also serve as clients, e.g., computing objects or devices 620, 622, 624, 626, 628, etc., as may be characteristic of a distributed computing environment.

Column 11, lines 29-31, delete "8" and replace with "7" to read:

Accordingly, the below general purpose remote computer described below in FIG. 7 is but one example of a computing device.

Column 11, lines 44-67 through Column 12, lines 1-10, delete "8" and replace with "7" to read:

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the exemplary computing system environment 700. With reference to FIG. 7, an exemplary remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720. Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.
A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

Column 12, lines 11-23, delete "8" and replace with "7" to read:

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in Fig. 7 include a network 772, such local area network (LAN) or a wide area network (WAN), but may also include other networks/buses. Such networking environments are commonplace in homes, offices, enterprise-wide computer networks, intranets and the Internet.